P. MURPHY.
Siphons.
No. 149,948.  Patented April 21, 1874.
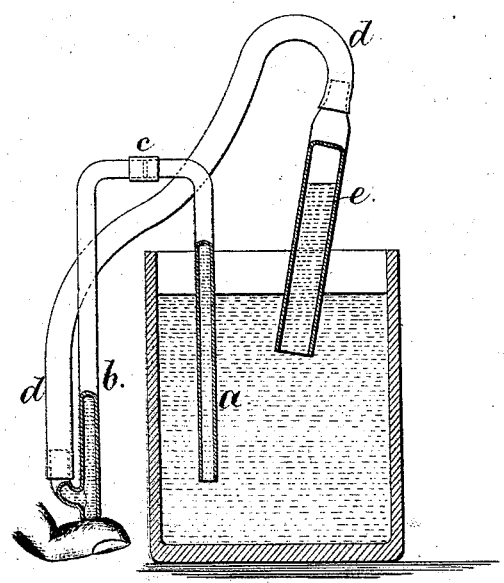

UNITED STATES PATENT OFFICE.

PETER MURPHY, OF WEST END, NEW JERSEY.

IMPROVEMENT IN SIPHONS.

Specification forming part of Letters Patent No. 149,948, dated April 21, 1874; application filed January 10, 1874.

*To all whom it may concern:*

Be it known that I, PETER MURPHY, of West End, in the county of Hudson and State of New Jersey, have invented an Improvement in Siphons, of which the following is a specification:

This siphon is especially intended for the use of photographers in drawing off their nitrate of silver and other solutions; but it may be employed wherever available.

Siphons that are exhausted by the mouth are objectionable, especially where poisonous or deleterious liquids are being decanted, because such liquids sometimes rush into the mouth.

I make use of a hydrostatic exhaustion-tube, which, when plunged into the liquid to be decanted, or into liquid in a separate vessel, fills, and then the finger or thumb is to be applied to the open end of the siphon, and the hydrostatic exhaustion-tube lifted sufficiently for its contained column to partially exhaust or dilate the contained atmosphere, and make the liquid rise by atmospheric pressure and run into the long leg of the siphon and fill the same; thereby, when the finger is removed, the liquid will run through the siphon, and the hydrostatic exhaustion-tube will no longer be required.

In the drawing a representation is given of the siphon in use.

The legs $a$ and $b$ of the siphon, if made of glass, are preferably united by a rubber tube, at $c$, and from the longer leg $b$ of the siphon a rubber or other elastic tube, $d$, extends, by a lateral branch, to the hydrostatic exhaustion-tube $e$. The operator places the leg $a$ in the liquid to be drawn off, and plunges the tube $e$ into the same liquid, or into liquid in another vessel. The siphon being open at the lower end of the leg $b$, the air is driven out as the liquid flows into and comes to its level within the tubes $a$ and $e$. The operator now closes the end of the tube $b$ with his finger or otherwise, and lifts the hydrostatic exhaustion-tube $e$, the contained column of liquid in which causes sufficient dilation or minus pressure to draw the liquid up the leg $a$ of the siphon and cause it to run into the leg $b$, so that when the finger is removed the liquid will flow through the siphon. The hydrostatic exhaustion-tube may then be removed, if desired.

It is preferable to employ a tube, $e$, of larger sectional area than that of the siphon.

Glass or other material may be employed for the siphon and hydrostatic exhaustion-tube.

I claim as my invention—

The hydrostatic exhaustion-tube $e$, connected by a flexible pipe to the lower end of the long leg of the siphon, for the purposes and substantially as set forth.

Signed by me this 8th day of January, 1874.

PETER MURPHY.

Witnesses:
GEO. T. PINCKNEY,
CHAS. H. SMITH.